Figure 1:
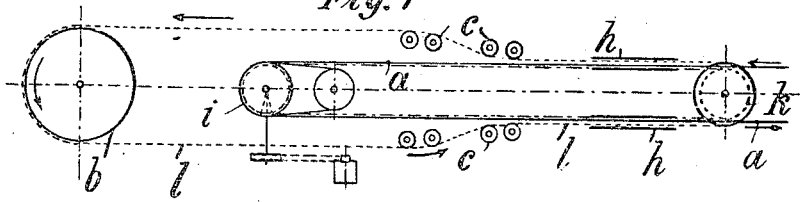

R. PFAFFENBACH.
ROPE RAILWAY.
APPLICATION FILED MAR. 13, 1908.

959,595.

Patented May 31, 1910.

4 SHEETS—SHEET 1.

Witnesses
R. J. Hadden
S. Ford

Inventor
Rudolf Pfaffenbach.
By R. Hadden
Attorney

R. PFAFFENBACH.
ROPE RAILWAY.
APPLICATION FILED MAR. 13, 1908.
959,595.
Patented May 31, 1910.
4 SHEETS—SHEET 2.
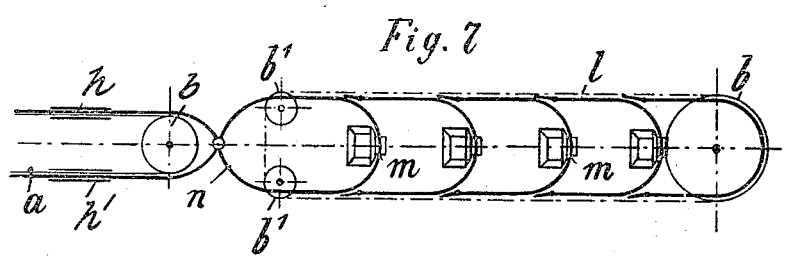
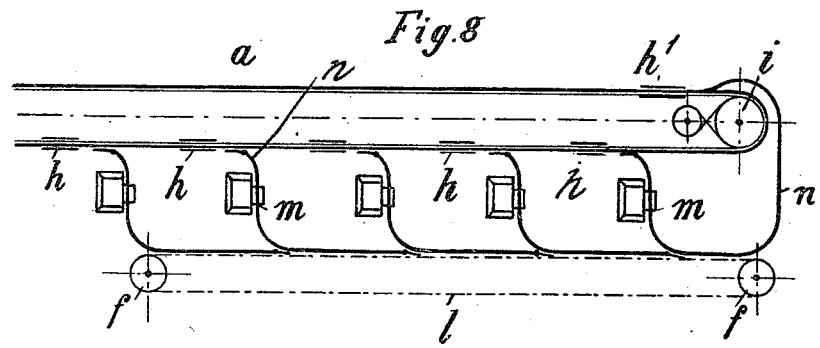
Witnesses
Inventor
Rudolf Pfaffenbach
By R. Hadden
Attorney

R. PFAFFENBACH.
ROPE RAILWAY.
APPLICATION FILED MAR. 13, 1908.

959,595.

Patented May 31, 1910.
4 SHEETS—SHEET 3.

Witnesses
A. J. Hadden
S. Ford

Inventor
Rudolf Pfaffenbach
by R. Hadden
Attorney

R. PFAFFENBACH.
ROPE RAILWAY.
APPLICATION FILED MAR. 13, 1908.

959,595.

Patented May 31, 1910.
4 SHEETS—SHEET 4.

Witnesses
S. Ford
A. W. Morrill

Inventor
Rudolf Pfaffenbach
by R. Hadden
Attorney

UNITED STATES PATENT OFFICE.

RUDOLF PFAFFENBACH, OF LEIPZIG, GERMANY, ASSIGNOR TO ADOLF BLEICHERT & COMPANY, OF LEIPZIG-GOHLIS, GERMANY.

ROPE-RAILWAY.

959,595.   Specification of Letters Patent.   Patented May 31, 1910.

Application filed March 13, 1908.   Serial No. 420,965.

*To all whom it may concern:*

Be it known that I, RUDOLF PFAFFENBACH, a subject of the German Emperor, residing at Leipzig, in Germany, have invented certain new and useful Improvements in Rope-Railways, of which the following is a specification.

The present invention relates to improvements in or connected with rope railways.

In rope railways with a continuously moving traction rope to which cars are coupled by grippers, the repeated winding of the rope around pulleys at the power-stations (to obtain sufficient friction) and the displacement of the tensioning drums at the tensioning stations renders through-going traffic impossible, and the coupling causes difficulty at curve-stations. Positive guidance of the cars cannot take place at these parts, the cars usually having to be propelled by hand. It has been proposed to incline the track at these parts, but with little success and reliability since the speed may become too high, or so low that the grips fail. Various arrangements have also been devised to take cars over curves, crossings, etc., by a supplementary traction rope with a separate gripper, after uncoupling the car from the main traction rope.

The present invention relates to improved means for securing as far as possible through-going traffic on rope-railways, for which purpose two grippers on the car are operated by the main traction rope or by the latter and a supplementary traction rope, so that one grip is released when the other is simultaneously locked. This object is effected by a combination of parts comprising a continuously moving hauling member, a second hauling member at stations, curves, branches, or on certain sections, said second member serving as a substitute for or being formed by the return run of said main member, double grip devices on the cars, adapted respectively to co-act with the two hauling members, common coupling rollers or other coupling members on the cars, and common coupling members such as rails at the stations, etc., whereby both car grips can be simultaneously and automatically operated to engage one and disengage the other, as hereinafter fully described.

Various embodiments of the invention are illustrated in the annexed drawing, in which—

Figure 2:
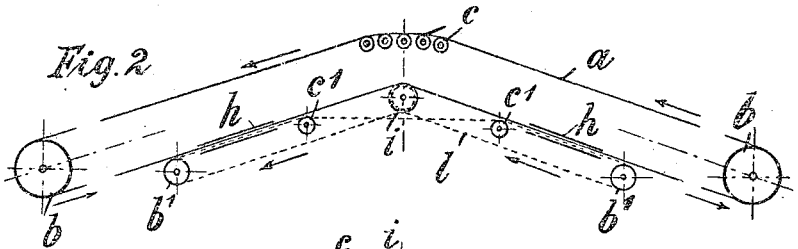
Figure 3:
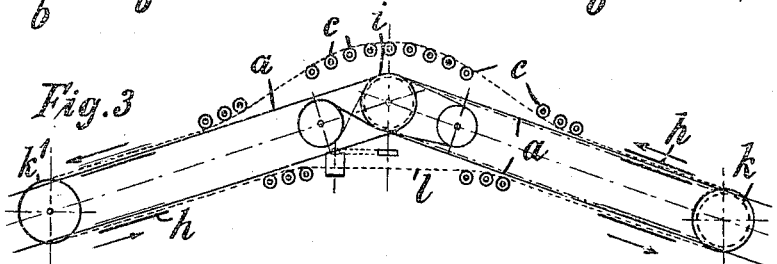
Figure 4:
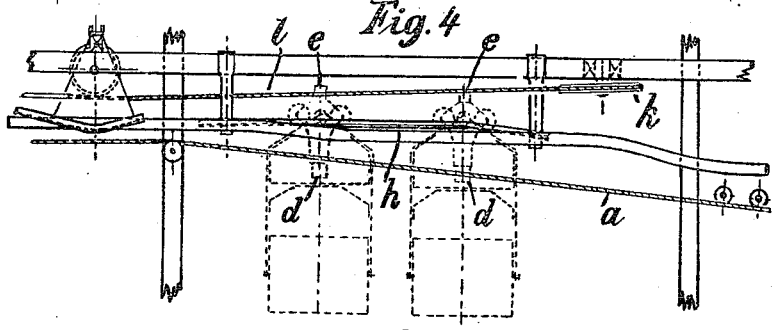
Figure 5:
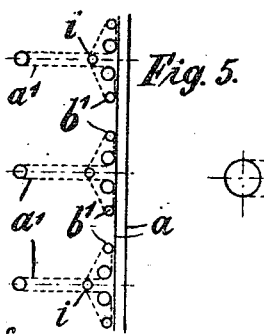
Figure 6:
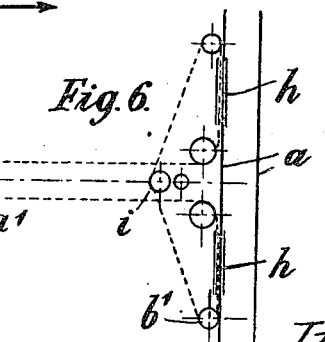
Figure 9:
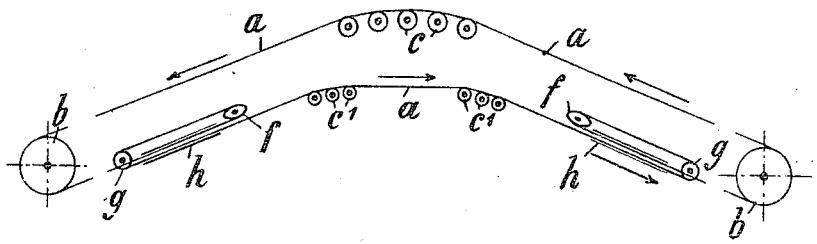
Figure 10:
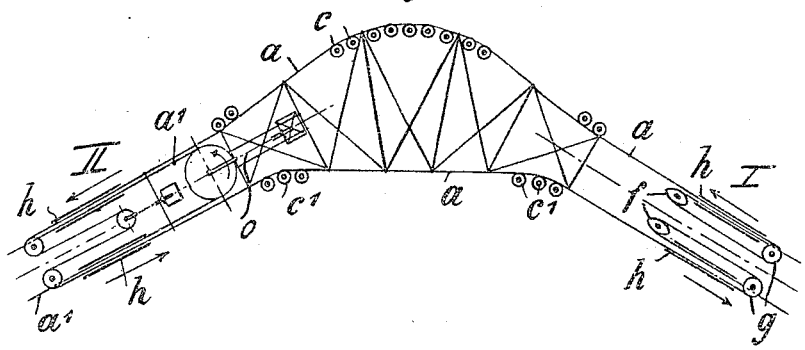
Figure 11:
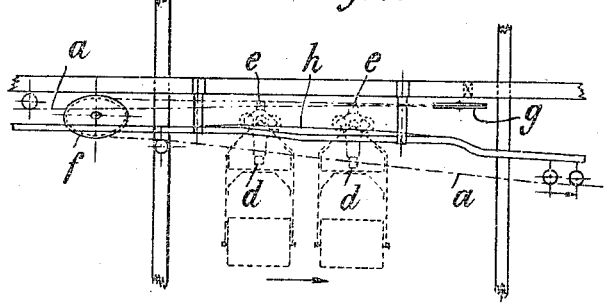
Figure 13:
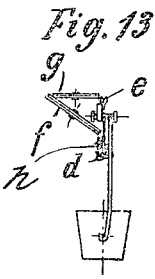
Figure 12:
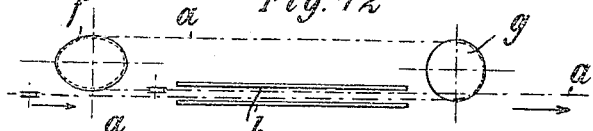
Figure 14:
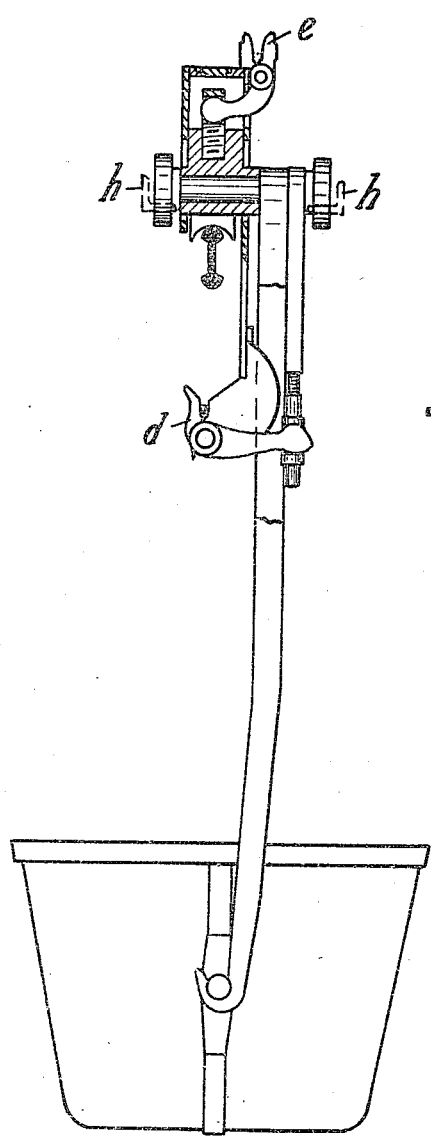

Figures 1 to 3 diagrammatically represent in plan view an arrangement with a second hauling rope which can be used, for certain sections of the line, instead of the main hauling rope, with a power station, a curve-station, and a combined power and curve-station respectively. Fig. 4 shows in elevation this arrangement at a coupling point. Figs. 5 and 6 are diagrams illustrating in plan the arrangement in a system with branch lines. Figs. 7 and 8 are diagrams illustrating in plan arrangements wherein the additional hauling rope forms a continuation of the main hauling rope, for the purpose of traveling to loading and unloading stations connected to the line. Figs. 9 and 10 diagrammatically illustrate in plan the manner of guiding a main hauling rope, which also serves as an auxiliary hauling rope, at a curve-station, and at a curve-station combined with a tensioning station respectively. Figs. 11, 12 and 13 illustrate in elevation, end view and plan respectively an arrangement at a coupling point, for alternatively actuating two coupling members. Fig. 14 is an end elevation partly in section and Fig. 15 a side elevation, both on a larger scale, of a car provided with two coupling devices for the purposes of this invention.

In the construction shown in Fig. 1, for a power or driving station, the main hauling rope $a$ passes over the driving pulley $i$. The latter also drives, by means of a pulley $k$, an auxiliary rope $l$ indicated by a dotted line, which passes about deflecting rollers $c$ and a pulley $b$. Each of the cars has an under rope grip $d$ and upper rope grip $e$, or similar coupling device. The alternative actuation of these two grips or the like is effected by means of coupling rails $h$ (Fig. 4), or the like, arranged at convenient points, so that one coupling device comes into action as soon as the other is placed out of action.

A similar arrangement at a curve-station is shown in Fig. 2. In this case the hauling rope $a$ running along the line is driven, in the direction indicated by the arrow, by a laterally arranged pulley $i$, about which it passes several times, and at the terminal stations it passes over pulleys $b$. At the side of the curve-station opposite that at which the said driving pulley $i$ is located, the hauling rope passes at the bend over deflecting rollers $c$. At the slipping point is arranged the auxiliary hauling rope $l$, which passes around pulleys $b^1$ and deflecting rollers $c^1$, and is also driven by the aforesaid pulley $i$. Coupling rails $h$ are arranged at the points where the hauling member is to be changed.

In Fig. 3 the main hauling rope $a$ is guided toward two sides by the pulley $i$. The auxiliary hauling rope $l$ passes over a pulley $k$ driven by the same driving pulley, and over a guiding pulley $k^1$ and deflecting rollers $c$. Coupling rails $h$ are arranged in front of the turning points and behind them.

Figs. 5 and 6 show arrangements for connecting a main line, having a hauling rope $a$, with a branch line or branch lines having hauling ropes $a^1$. The main hauling rope passes straight along the main line and hauls the cars past the junctions without being uncoupled if the coupling devices $h$ are out of action. Each branch line has a separate hauling rope $a^1$, which is the main hauling rope for the respective branch line. This rope $a^1$ is so guided over pulleys $b^1$ that if the coupling devices $h$ are in action the cars are uncoupled from the rope $a$ and coupled to the rope $a^1$, or vice versa. One or more branch lines can thus be alternatively connected to the main line, and the transfer or switching of the cars takes place automatically. The branch lines unconnected to the main line in no way interfere with the automatic action. The hauling ropes $a^1$, which are the main hauling ropes of the branch lines, serve as auxiliary hauling ropes for the reversal. Two separate hauling ropes, one for the main line and one for the branch line, are used where it is desired that the running of the cars to and from loading and unloading stations should be as far as possible mechanical. In this case the second hauling rope forms a continuation of the main hauling rope, being directly connected to the latter or through a hand-controlled intermediate part. Arrangements of this kind are shown in Figs. 7 and 8.

In Fig. 7 the main hauling rope $a$ passes back over the pulley $b$. The loading station connected to the line has branches $m$ and a hauling member $l$, in this case a chain, passing over pulleys $b^1$. At the coupling point $h$ the car is uncoupled from the rope $a$, moved by hand over the short bridge $n$, and coupled to the auxiliary hauling rope $l$, by which it is moved to the desired loading station, where it is received by a workman who, after loading it, guides it back to the auxiliary hauling member for the return. When the car has passed the short bridge $n$ again it is coupled at $h^1$ to the hauling rope $a$.

The arrangement shown in Fig. 8 is similar, but the station is arranged at the side of the main line. The car is uncoupled at $h$ from the main hauling rope $a$, which passes over the driving pulley $i$, and is moved over $n$ by hand and coupled to the hauling member $l$, passing around rollers $f$ and which pulls the car to the desired loading stations $m$. After being loaded the car travels to the coupling points $h^1$ and is coupled to the main hauling rope. If necessary, the member $l$ may, of course, extend to the coupling point $h$.

In the arrangement shown in Fig. 9 the main hauling rope also serves as the auxiliary hauling rope. This single rope $a$ positively moves the cars in the direction indicated by the arrow, and passes at the terminals over reversing pulleys $b$, one of which is connected to the driving mechanism and the other to the tensioning mechanism. At the curve-station the hauling rope passes over deflecting rollers $c$ and $c^1$. Adjacent the rollers $c^1$, which cannot be automatically passed by the grip used on the free line (for example the under rope grip $d$, Fig. 11) the hauling rope is turned, i. e. guided upward by pulleys $f$ $g$, so that it can be gripped by the upper rope grip $e$ (Fig. 11). The alternative actuation of these two grips $d$ and $e$ is effected by means of coupling rails $h$ (Figs. 11 to 13), on which the cars must run.

Fig. 10 shows a transfer station for two main lines I and II, with main hauling ropes $a$ and $a^1$. The rope $a$, guided over pulleys $g$ and $f$, and deflecting rollers $c$, serves as the auxiliary hauling rope for the automatic transfer of cars from one line to the other. The coupling points $h$ are arranged in the manner already described. The rope tensioning mechanism $o$ may be constructed to serve also as the driving mechanism or may be combined therewith.

In general it may be mentioned that cars are provided with grips according to the nature and position of the main hauling member and auxiliary hauling member, or in the case of the auxiliary member the car may be moved by friction.

Figure 15:
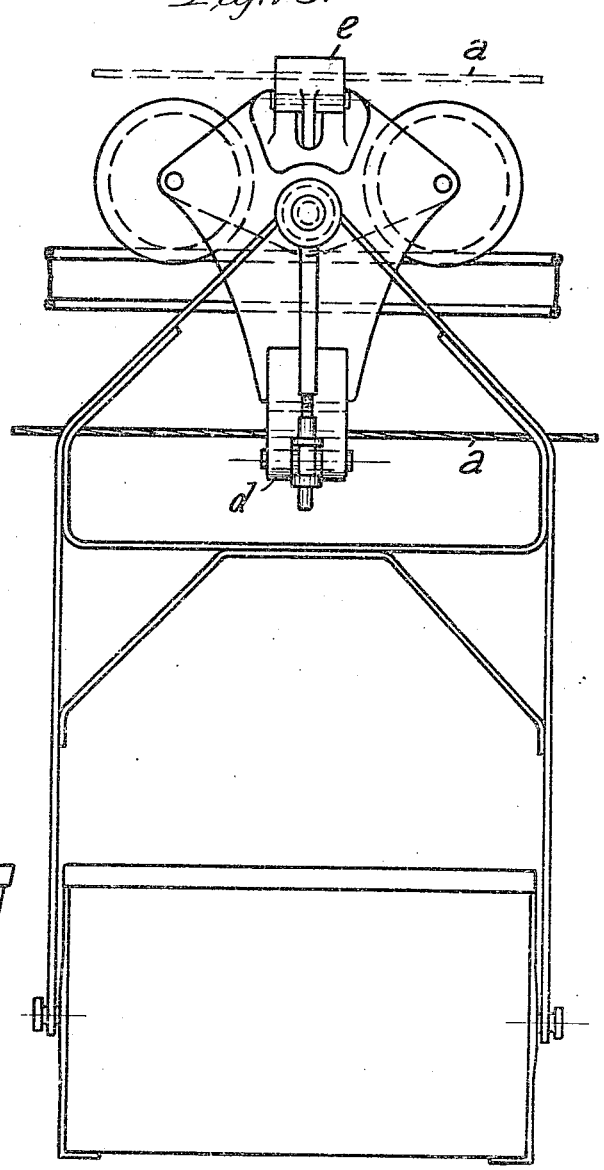

A car provided with two grips is shown in Figs. 14 and 15, the construction of the several grips forms no part of the present invention. They may be of any usual kind.

The cars are provided with double grips adapted to be actuated by devices common to them both, for example coupling rollers and coupling rails. The action in this case can be easily understood by examining Figs. 4 and 11 to 13. A car, coupled for example to the upper rope, travels from the station on to a line, and passes over the coupling rail $h$. The respective grip $e$ is opened by the abutment of the common coupling rollers of the cars against the coupling device, and releases the rope, and at the same time the rope is gripped by the lower grip $d$, so that the car is hauled by the said lower rope.

When the car passes another coupling point the action is reversed, the rope leaves the grip which acts on the line and is gripped by the grip which acts at stations, or in some arrangements an auxiliary hauling rope is gripped.

The general arrangement of the hauling members and grips or coupling devices may be of any suitable kind. The main hauling rope may be above the line, and the return or the auxiliary rope below the line, or vice versa, or both may be at the same level. The hauling member need not necessarily be a rope; a chain may be used, more particularly as the auxiliary hauling member, and different kinds of hauling members may be used in the same system. Separate motor mechanism may be used for the auxiliary hauling member, if desired.

What I claim as my invention and desire to secure by Letters Patent of the United States is:—

1. In a rope railway the combination of a continuously moving main hauling member, a second hauling member at certain sections thereof, cars adapted to be moved by said hauling members, double grip devices on the cars adapted respectively to coact with the two hauling members, common coupling members on the cars and common coupling members at the aforesaid sections, adapted to automatically operate said grip devices whereby one is engaged with and the other simultaneously disengaged from a hauling member, substantially as described.

2. In a rope railway the combination of a continuously moving main hauling member, a second hauling member at certain sections thereof, said second member being formed by the return run of said main member, cars adapted to be moved by said hauling members, double grip devices on the cars adapted respectively to coact with the two hauling members, common coupling rollers on the cars, and common coupling rails at the aforesaid sections adapted to automatically operate said grip devices whereby one is engaged with and the other simultaneously disengaged from a hauling member, substantially as described.

3. In a rope railway the combination of a track, a continuously moving main hauling member, a second hauling member at certain sections thereof, cars suspended from said track and adapted to be moved by said hauling members, superposed double grip devices on the cars adapted respectively to coact with the two hauling members, common coupling rollers on the cars, and common coupling rails at the aforesaid sections adapted to automatically operate said grip devices whereby one is engaged with and the other simultaneously disengaged from a hauling member, substantially as described.

In witness whereof I have signed this specification in the presence of two witnesses.

RUDOLF PFAFFENBACH.

Witnesses:
FRITZ V. KELLER,
ROBERT SCHÜTZ.